United States Patent [19]

Kobayashi et al.

[11] 4,209,821

[45] Jun. 24, 1980

[54] MULTI-BREAKER TYPE GAS-INSULATED SWITCHGEAR

[75] Inventors: Nobumitsu Kobayashi; Tatsuo Iida, both of Yokohama, Japan

[73] Assignee: Tokyo Shibaura Denki Kabushiki Kaisha, Kawasaki, Japan

[21] Appl. No.: 936,388

[22] Filed: Aug. 24, 1978

[30] Foreign Application Priority Data

Oct. 7, 1977 [JP] Japan .............................. 52-120777

[51] Int. Cl.² ............................................. H02B 1/04
[52] U.S. Cl. ................................... 361/341; 361/333; 200/50 AA
[58] Field of Search ........... 200/50 AA, 50 C, 148 R, 200/148 B, 148 D; 361/331–335, 341

[56] References Cited

U.S. PATENT DOCUMENTS

| | | | |
|---|---|---|---|
| 1,986,619 | 1/1935 | Blake | 361/333 |
| 3,235,774 | 2/1966 | Frowein | 361/335 |
| 4,032,820 | 6/1977 | Oishi et al. | 361/333 |

OTHER PUBLICATIONS

Siemens Review, vol. XLIV, No. 7, 1977, pp. 315–319, by Gilmozzi, Hashoff, Lorenz.
Brown Boveri, Review, vol. 60, Apr. 1973, pp. 140–152, by Mauthe, Hogg, Horisberger.

Primary Examiner—Gerald P. Tolin
Attorney, Agent, or Firm—Oblon, Fisher, Spivak, McClelland & Maier

[57] ABSTRACT

Disclosed is a multi-breaker type gas-insulated switchgear to couple two main bus bars of which three switching blocks are connected, respectively, between each pair of in-phase single phase bus bars of two main bus bars, in which each switching block includes a plurality of switching unit each having a gas-insulated circuit breaker, the switcing units are connected in series and arranged flush and substantially parallel with one another with each end trued up, whereby the resultant three switching blocks are arranged flush, close and substantially parallel with and to one another with each end trued up.

5 Claims, 10 Drawing Figures

MULTI-BREAKER TYPE GAS-INSULATED SWITCHGEAR

PRIOR ART OF THE INVENTION

This invention relates to a multi-breaker type gas-insulated switchgear comprising first and second three-phase main bus bars each consisting of first, second and third single phase bus bars, switching units each having a gas-insulated circuit breaker, first, second and third switching blocks each including a plurality of said switching units connected in series by connecting bus bars and branch bus bars each extending from the connecting bus bar between two switching units connected with one another, a three-phase switching portion having the first, second and third switching blocks connected, respectively, between the first single phase bus bar of the first main bus bar and the corresponding first in-phase signal phase bus bar of the second main bus bar, between the second single phase bus bar of the first main bus bar and corresponding second in-phase single phase bus bar of the second main bus bar, and between the third signal phase bus bar of the first main bus bar and the corresponding third in-phase single phase bus bar of the second main bus bar, and a housing containing said two main bus bars and the three-phase switching portion.

Heretofore, there have been known above mentioned multi-breaker type gas-insulated switchgears, of which the number of switching units required is three for a 1½-breaker type and two for a 2-breaker type.

A plurality of switching units for each phase connected in series have conventionally been substantially in a beeline in the longitudinal direction along which the current flows through the gas-insulated circuit breaker included in each switching unit. Accordingly, a switching block for one phase, including the plurality of switching units arranged as aforesaid, may become nearly twice or thrice as long as a single switching unit, requring elongated setting space for a gas-insulated switchgear even if three switching blocks each for one phase are placed side by side. In setting the switchgear to connect the main bus bars, however, it has been hard freely to determine the setting place and its shape, causing increasing difficulties in the selection of the location for the switchgear which requires such elongated setting space as in the prior art system. Therefore, there has been a demand for the development of switchgears capable of easy selection of location, requring no such elongated setting space.

SUMMARY OF THE INVENTION

The object of this invention is to provide a multi-breaker type gas-insulated switchgear requiring no such elongated setting space that has been essential to a prior art system, with the length to width ratio of the setting space for each three-phase circuit approximated to 1 as compared with that of the prior art system.

In order to attain the above object, the gas-insulated switchgear of this invention is characterized in that the circuit breakers in the switching units of each switching block are arranged substantially flush and parallel with one another with each end trued up, and that all the three switching blocks included in the three-phase switching portion are arranged with each end trued up so that all the circuit breakers run flush and parallel with one another.

According to such gas-insulated switchgear, a plurality of switching units are placed side by side as aforesaid to form a switching block for one and the same phase of the main bus bars and such switching blocks for three phases are further juxtaposed as aforesaid, so that the setting space for the switchgear may be reduced to a shorter rectangular shape as compared with the case of the prior art system in which the switching units for each phase are arranged substantially in a beeline, greatly facilitating the selection of the location.

DETAILED DESCRIPTION OF THE PREFERRED EMBODIMENT

Referring now to FIGS. 1 to 6, there will be described a first embodiment of the gas-insulated switchgear of this invention or a 1½-breaker type gas-insulated switchgear.

Figure 1:
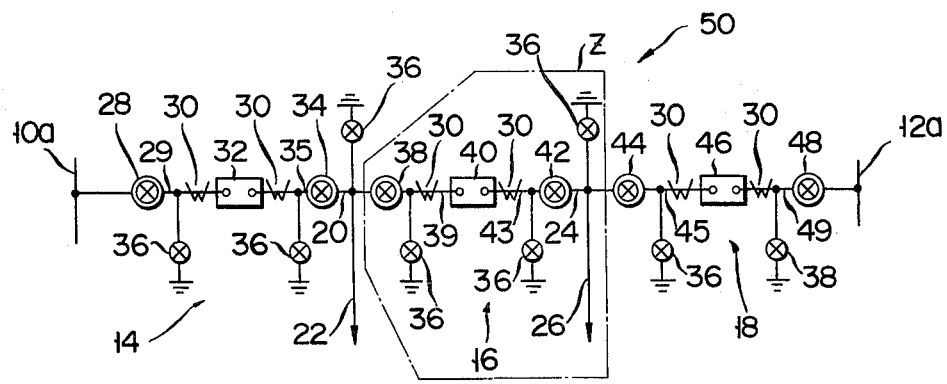
FIG. 1 is a connection diagram of a switching block for one phase of a 1½-breaker type gas-insulated switchgear according to an embodiment of this invention.
Figure 6:
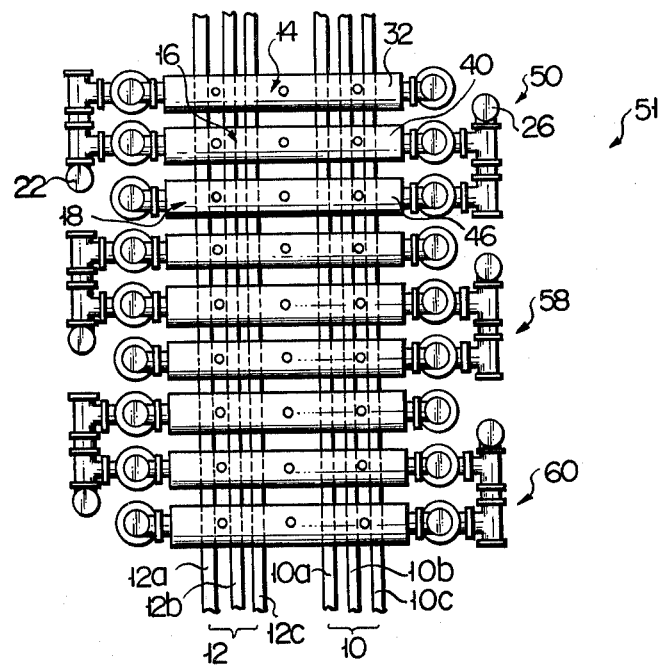
FIG. 6 is a plan view of a three-phase switching portion including three switching blocks of FIG. 2 placed side by side.

FIG. 1 shows the connection in a switching block for one phase which couples one of the single phase bus bars 10a of the first main bus bar 10 (FIG. 6) and corresponding in-phase single bus bar 12a of the second main bus bar 12 (FIG. 6), the first main bus bar 10 consisting of first, second and third single phase bus bars 10a, 10b and 10c, and the second main bus bar 12 consisting of first, second and third single phase bus bars 12a, 12b and 12c (FIG. 6). This switching block is referred to as a first switching block 50. The switching block 50 comprises three switching units 14, 16 and 18, a connecting bus bar 20 connecting the switching units 14 and 16, a branch bus bar 22 extending from the connecting bus bar 20, a connecting bus bar 24 connecting the switching units 16 and 18, and a branch bus bar 26 extending from the connecting bus bar 24.

The switching unit 14 includes a series circuit of a disconnecting switch 28 connected to the single phase bus bar 10a, a current transformer 30, a first gas-insulated circuit breaker 32, another current transformer 30, and a disconnecting switch 34 connected to the connecting bus bar 20 which is connected with its adjacent switching unit 16, a ground system 36 connected between the conductor connecting the disconnecting switch 28 and the current transformer 30 and the ground, and another ground system 36 connected between the conductor connecting the disconnecting switch 34 and the current transformer 30 and the ground.

The switching unit 16 includes a series circuit of a disconnecting switch 38 connected to the connecting bus bar 20, a current transformer 30, a second gas-insulated circuit breaker 40, another current transformer 30, and a disconnecting switch 42 connected to the connecting bus bar 24 which is connected with the switching unit 18, a ground system 36 connected between the conductor connecting the disconnecting switch 38 and the current transformer 30 and the ground, and another ground system 36 connected between the conductor connecting the disconnecting switch 42 and the current transformer 30 and the ground.

Further, the switching unit 18 includes a series circuit of a disconnecting switch 44 connected to the connecting bus bar 24, a current transformer 30, a third gas-insulated breaker 46, another current transformer 30, and a disconnecting switch 48 connected to the single phase bus bar 12a, a ground system 36 connected between the conductor connecting the disconnecting switch 44 and the current transformer 30 and the ground, and another ground system 36 connecting the conductor connecting the disconnecting switch 48 and the current transformer 30 and the ground.

In FIG. 1, the single phase bus bar 10a may be either disconnected from the branch bus bars 22 and 26, or connected only to the branch bus bar 22, or connected to both the bus bars 22 and 26 by switching the first to third circuit breakers and the disconnecting switches 28, 34, 38, 42, 44 and 48 connected to the switching units 14, 16 and 18, as required. Also, the single phase bus bar 12a may be either disconnected from the branch bus bars 22 and 26, or connected only to the bus bar 26, or connected to both the bus bars 22 and 26.

Figure 2:
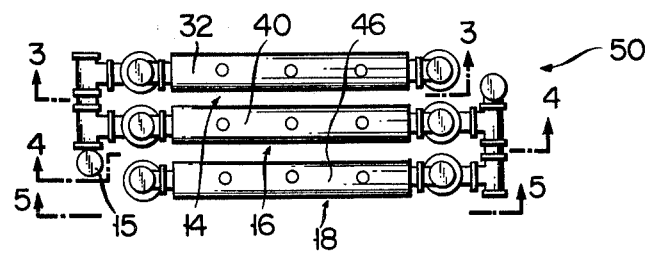
FIG. 2 is a plan view of the switching block of FIG. 1.
Figure 3:
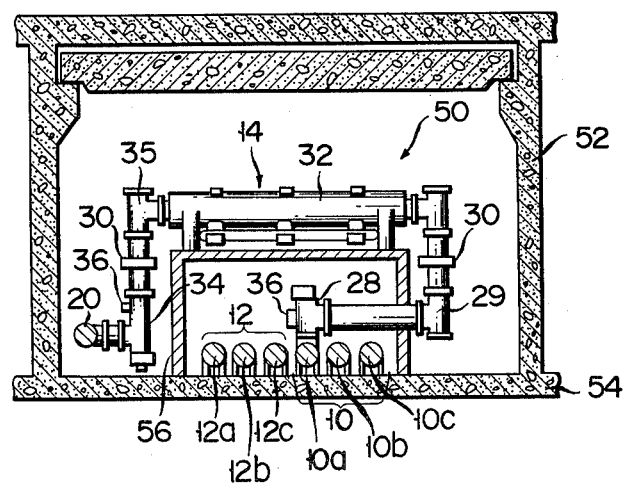
FIG. 3 is a sectional view of the switchgear of the invention as taken along line 3—3 of FIG. 2.
Figure 4:
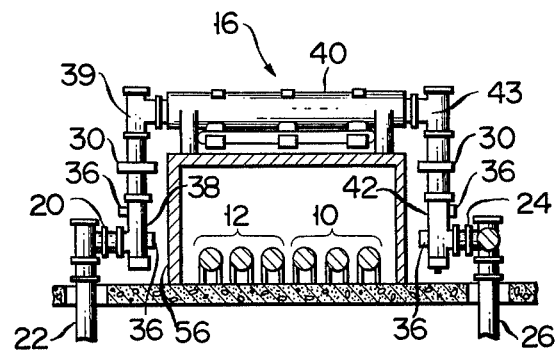
FIGS. 4 and 5 are sectional views of the switching block of FIG. 2 as taken along lines 4—4 and 5—5, respectively.
Figure 5:
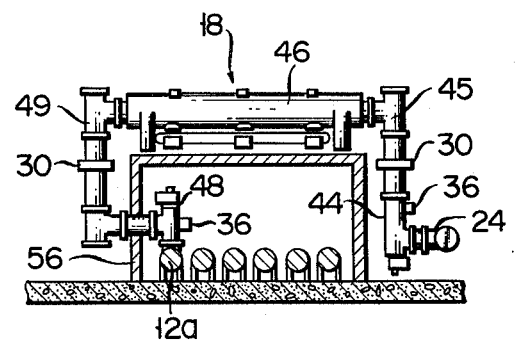

FIG. 2 is a plan view showing the arrangement of the switching units 14, 16 and 18 included in the first switching block 50. FIG. 3 is a sectional view of the first switching block 50 disposed in a housing 52 as taken along line 3—3 of FIG. 2, chiefly showing the switching unit 14. FIGS. 4 and 5 are sectional views of the first-phase switching block 50 as taken along lines 4—4 and 5—5 of FIG. 2, mainly showing the switching units 16 and 18, respectively. As shown in FIGS. 2 to 5, the first, second and third gas-insulated circuit breakers (hereinafter referred to simply as breakers) 32, 40 and 46 are arranged in parallel with the level portion of a frame 56 mounted on a floor 54 of the housing 52, with their longitudinal directions taken in parallel with each other and with their ends on either side trued up, and are connected with other related members as described with reference to FIG. 1 to form the first switching block. The longitudinal direction of the breakers 32, 40 and 46 is a right and left direction of FIGS. 2 to 5 along which the electric current flows through the breakers.

As shown in FIGS. 2 to 6, the first and second main bus bars 10 and 12 are disposed over the floor 54 under the frame 56 in a direction substantially perpendicular to the longitudinal direction of the breakers 32, 40 and 46. The first main bus bar 10 is formed of three first, second and third single phase bus bar 10a, 10b and 10c, while the second main bus bar 12 is composed of first, second and third single phase bus bar 12a, 12b and 12c. Among these single phase bus bars, the pairs of bars 10a and 12a, 10b and 12b, and 10c and 12c are each in the same phase. The housing 52 is omitted in FIGS. 2, 4 and 6 for the simplicity of the drawings.

In FIG. 3, the single phase bus bar 10a of the first main bus bar 10 is connected to the disconnecting switch 28 located above, the disconnecting switch 28 extending to the right as illustrated and being connected to one end or right terminal of the first breaker 32 by means of a connecting member 29 rising upright. The other end or left terminal of the first breaker 32 is connected to the disconnecting switch 34 by means of a connecting member 35, the disconnecting switch 34 being connected to the connecting bus bar 20. The connecting members 29 and 35 are separately coupled with the current transformers 30. Numeral 36 connected to the connecting member 29 and 35 denotes the ground systems as shown in FIG. 1.

The connecting bus bar 20 of FIG. 3 is connected to the top of the branch bus bar 22 of FIG. 4 and to the disconnecting switch 38, which is connected to one end or left terminal of the second breaker 40 of FIG. 4 by means of a connecting member 39 extending upward. The other end or right terminal of the breaker 40 is connected to the disconnecting switch 42 by means of a connecting member 43 extending downward. Numerals 30 and 36 designate the same current transformer and ground system as shown in FIG. 3, respectively. The disconnecting switch 42 is connected to the connecting bus bar 24 and the branch bus bar 26.

The connecting bus 24 of FIG. 4 is connected to the disconnecting switch 44 of FIG. 5, which is connected to one end or right terminal of the third breaker 46 by means of a connecting member 45 extending upward. The left terminal of the breaker 46 is connected to the disconnecting switch 48 by means of a connecting member 49 extending downward and bent at the bottom to the right as illustrated. The disconnecting switch 48 is connected to single phase bus bar 12a included in the second main bus bar 12 which is at an in-phase condition with the corresponding single bus bar 10a of the first main bus bar 10, the bus bar 12a being located below the disconnecting switch 48. Numerals 30 and 36 designate the same current transformer and ground system as shown in FIG. 3, respectively.

As may be seen from FIG. 4, the branch bus bars 22 and 26 extend, respectively, from the connecting bus bars 20 and 24 down into the ground through the floor 54, and are thereafter led to transformers or transmission lines by a well-known method.

In the housing 52, there are set a second switching block 58 having substantially the same construction as that of the switching block 50 and coupling the single phase bus bars 10b and 12b and a third switching block 60 coupling the single phase bus bars 10c and 12c, as well as the first switching block 50. Hereupon, the first, second, and third switching blocks 50, 58 and 60 are mounted on the frame 56 at a short distance from one another so that the breakers 32, 40 and 46 included in each individual switching block run substantially in parallel with one another with each end practically trued up. The three switching blocks 50, 58 and 60 juxtaposed as aforesaid are collectively referred to as a three-phase switching portion. FIG. 6 is a plan view of such three-phase switching portion 51.

The length of the three-phase switching portion 51 in the longitudinal direction may substantially be reduced by forming each switching block as shown in FIGS. 2 to 5 and arranging the three switching blocks as shown in FIG. 6. It may be done mainly because the switching blocks are not arranged in alignment with each other, unlike the prior art system, but are all placed side by side. Besides, as may be seen from FIGS. 2 to 5, the disconnecting switches and other members connected on each side of the first, second and third breakers 32, 40 and 46 are not flush with the breakers, but extend downward from the breakers or lie thereunder, thereby forming the switching blocks in three dimensions. Thus, the length of the three-phase switching portion 51 in the longitudinal direction may be short, so that the setting space for the switching portion 51 will not be of so elongate a shape. Accordingly, the length to width ratio of the setting space of the three phase switching portion 51 may be approximated to 1 as compared with that of the prior art system, greatly facilitating the selection of the setting location and reducing the area thereof.

Referring now to FIGS. 7 to 10, there will be described a 2-breaker type gas-insulated switchgear according to a second embodiment of the invention. Like reference numerals in these drawings that appear in FIGS. 1 to 6 refer to numbers with substantially the same functions.

Figure 7:
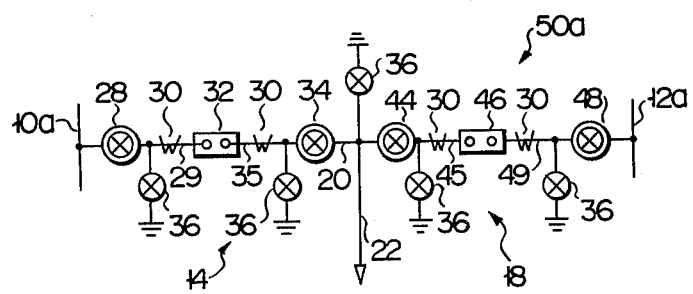
FIG. 7 is a connection diagram of a switching block for one phase of a 2-breaker type gas-insulated switchgear according to another embodiment of the invention.

FIG. 7 is a connection diagram of a switching block for one phase of the switchgear of this embodiment. In this case, the branch bus bar may be one in number. The connection diagram of FIG. 7 is part of FIG. 1 cleared of a section Z enclosed by a chain line. A first switching block 50a as shown in FIG. 7 is formed of two switching units 14 and 18 and other members. Thus formed first, second and third switching blocks 50a, 58a and 60a (FIG. 8) are connected, respectively, between the bars 10a and 12a, between the bars 10b and 12b and between the bars 10c and 12c (FIGS. 9 and 10).

Figure 8:
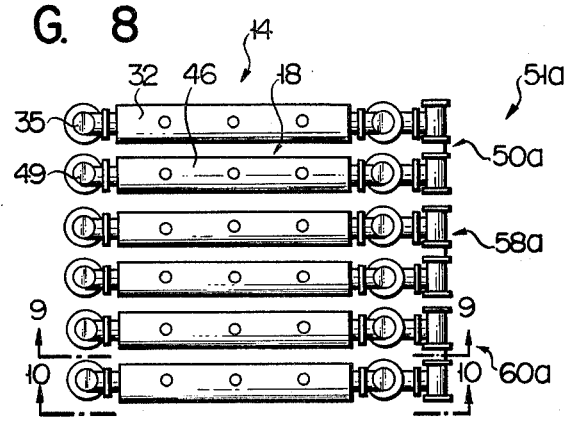
FIG. 8 is a plan view of a three-phase switching portion including three switching blocks of FIG. 7 placed side by side.
Figure 9:
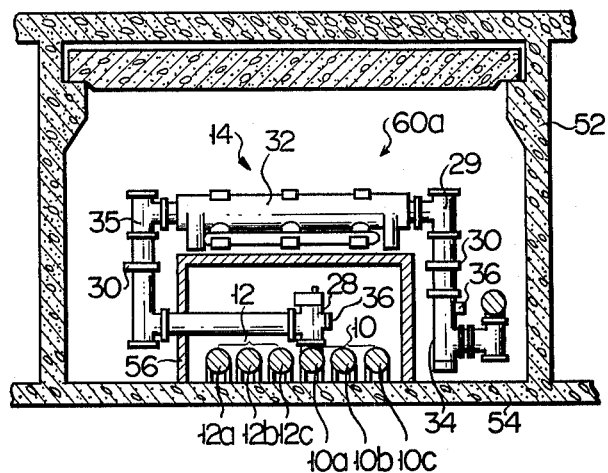
FIG. 9 is a sectional view of the switchgear of the second embodiment as taken along line 9—9 of FIG. 8.
Figure 10:
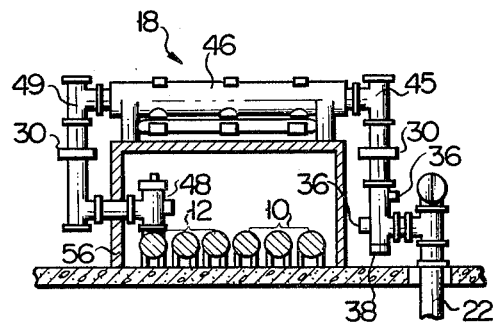
FIG. 10 is a sectional view of the three-phase switching portion of FIG. 8 as taken along line 10—10.

FIG. 8 shows a three-phase switching portion 51a of the 2-breaker type gas-insulated switchgear, while FIG. 9 is a sectional view of the three-phase switching portion 51a mounted in the housing 52 as taken along line 9—9 of FIG. 8, chiefly showing the switching unit 14 included in the third switching block 60a. FIG. 10 is a sectional view of the switching portion 51a of FIG. 8 as taken along line 10—10, mainly showing the switching unit 18 included in the switching block 60a. Since two switching units are included in each switching block for one phase in FIGS. 8 to 10, the connection between each bus bar and the corresponding switching units is made from one side of each switching unit, that is, from the left side as in FIGS. 9 and 10. Further construction and arrangement of other members are excluded from the description here, because they are the same as those of the first embodiment.

Also in the 2-breaker type gas-insulated switchgear of this embodiment, all the breakers 32 and 46 used are placed side by side in the same manner as in the first embodiment, and the switching units 14 and 18 are formed in three dimensions. Thus, as in the case of the 1½-breaker type, there may be obtained a gas-insulated switchgear capable of easy selection of location with the shape of the setting space not so elongate.

What we claim is:

1. A multi-breaker type gas-insulated switchgear, comprising: first and second three-phase main bus bars extending horizontally in parallel with each other, each said main bus bar consisting of first, second and third single phase bus bars; switching units each having a gas-insulated circuit breaker; first, second and third switching blocks each including a plurality of said switching units connected in series by connecting bus bars and branch bus bars each extending from the connecting bus bar between two switching units connected with one another, said circuit breakers in said switching units of each said switching block being arranged substantially horizontal, flush and parallel on different planes with one another and aligned parallel to said main bus bars with each end trued up; a three-phase switching portion having the first, second and third switching blocks connected, respectively, between the first single phase bus bar of the first main bus bar and the corresponding first in-phase single phase bus bar of the second main bus bar, between the second single phase bus bar of the first main bus bar and the corresponding second in-phase single phase bus bar of the second main bus bar, and between the third single phase bus bar of the first main bus bar and the corresponding third in-phase single phase bus bar of the second main bus bar, all said three switching blocks being arranged with each end trued up so that all said breakers run flush and parallel with one another; and a housing containing said two main bus bars and said three-phase switching portion.

2. A multi-breaker type gas-insulated switchgear according to claim 1, wherein three series-connected switching units are connected between the in-phase bus conductors and the branch bus bar is connected between every two of said switching units.

3. A multi-breaker type gas-insulated switchgear according to claim 1, wherein two series-connected switching units are connected between the in-phase bus conductors and the branch bus bar is connected between the two switching units.

4. A switchgear according to claim 1, wherein said two sets of main bus bars extend at right angles to the longitudinal direction of said circuit breakers.

5. A switchgear according to claim 4, wherein said two main bus bars lie under said circuit breakers.

* * * * *